L. A. ANFINSON.
CORN PLANTER.
APPLICATION FILED JUNE 3, 1912.
1,076,938.
Patented Oct. 28, 1913.
3 SHEETS—SHEET 1.
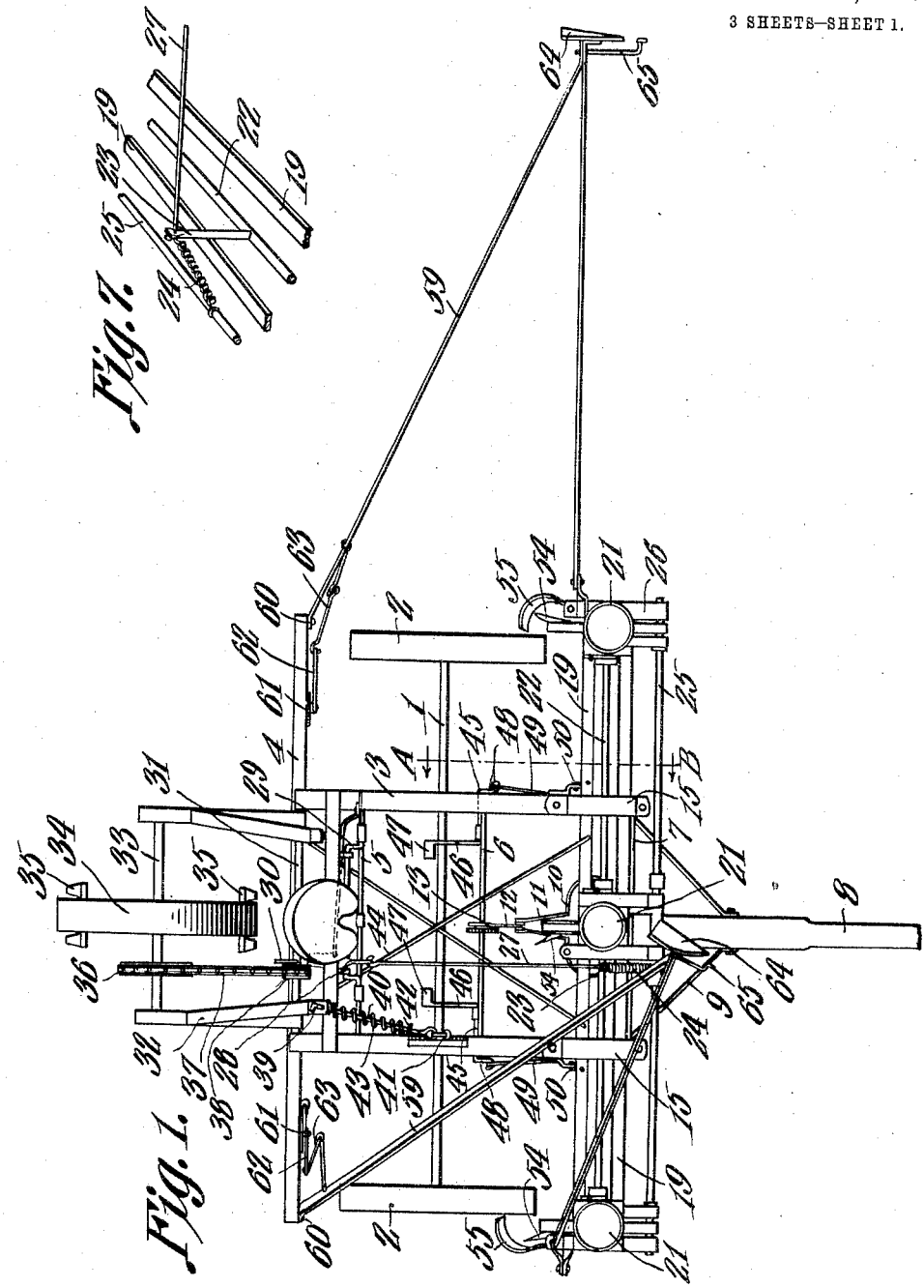
Witnesses
Lars A. Anfinson,
Inventor
by C. A. Snow & Co.,
Attorneys

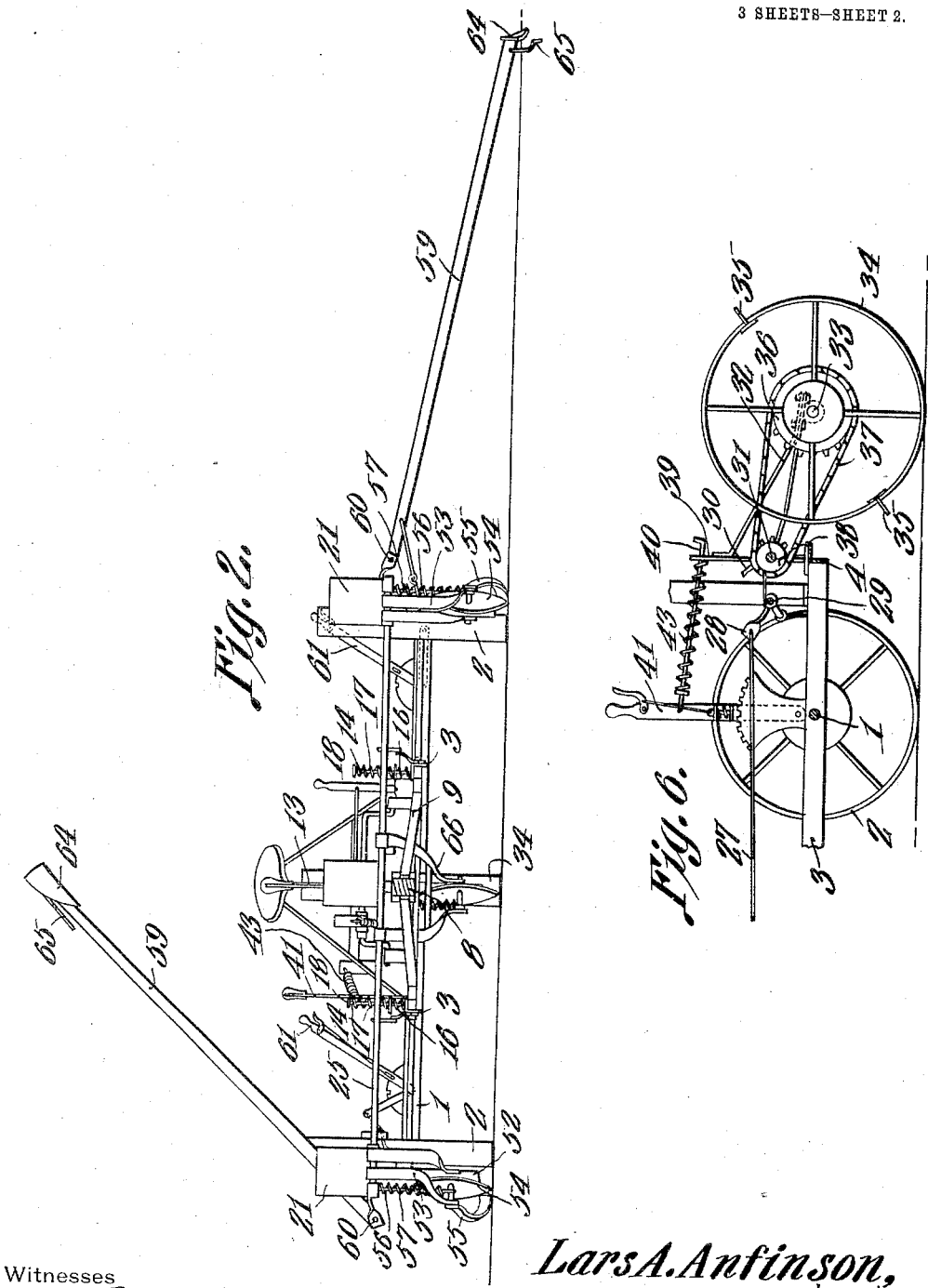

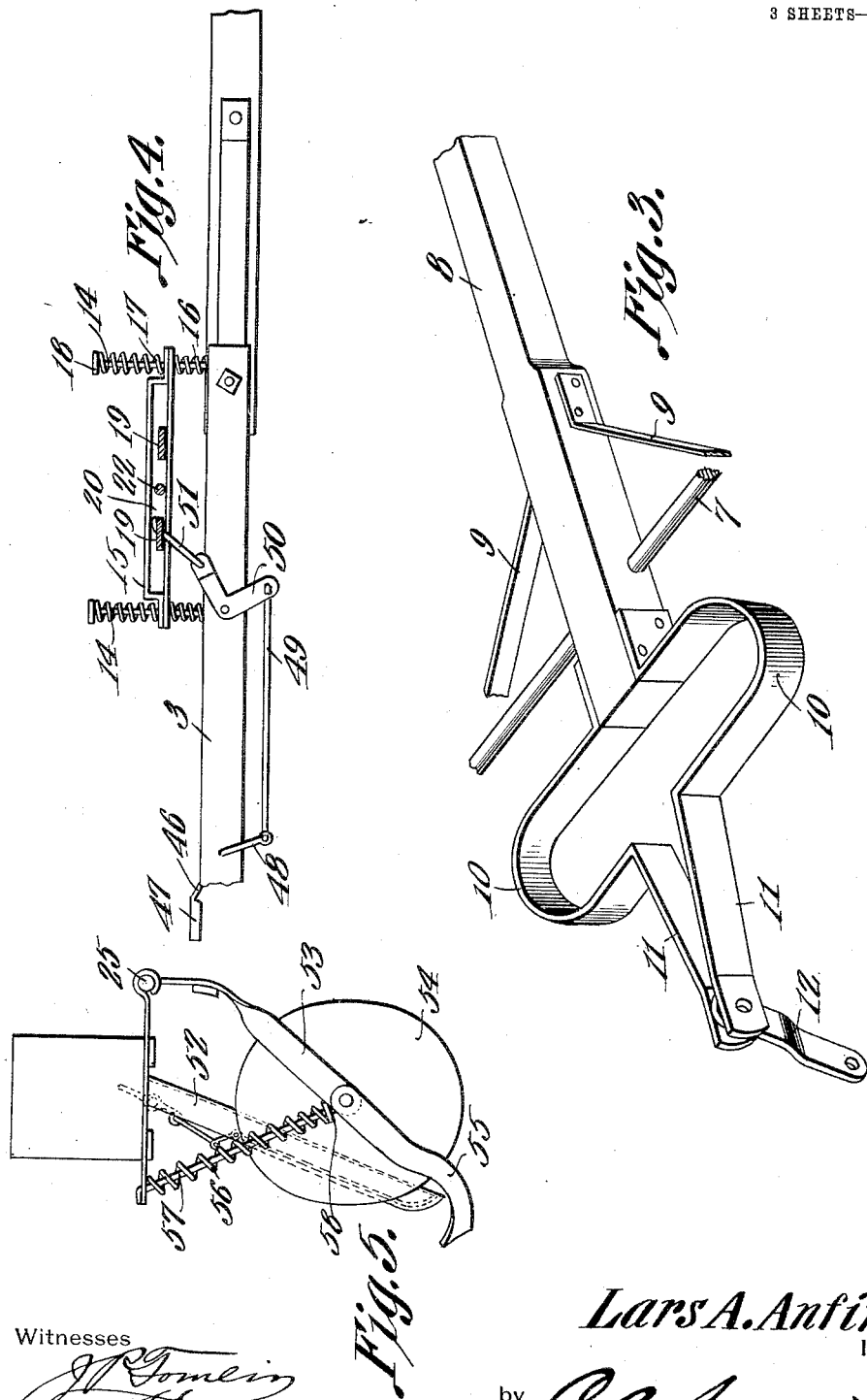
L. A. ANFINSON.
CORN PLANTER.
APPLICATION FILED JUNE 3, 1912.
1,076,938.
Patented Oct. 28, 1913.
3 SHEETS—SHEET 3.
Lars A. Anfinson
Inventor
by C.A.Snow & Co.
Attorneys
Witnesses

UNITED STATES PATENT OFFICE.

LARS A. ANFINSON, OF CLERMONT, IOWA.

CORN-PLANTER.

1,076,938. Specification of Letters Patent. Patented Oct. 28, 1913.

Application filed June 3, 1912. Serial No. 701,346.

*To all whom it may concern:*

Be it known that I, LARS A. ANFINSON, a citizen of the United States, residing at Clermont, in the county of Fayette and State of Iowa, have invented a new and useful Corn-Planter, of which the following is a specification.

This invention relates to corn planters, its object being to provide a light, durable and compact machine of this character for planting two or more rows simultaneously, means being provided whereby the furrow openers are maintained constantly under the control of the driver so as to form furrows of desired depths.

A further object is to provide means whereby the planter can be adjusted to follow any irregularities in the contour of the surface over which the machine is moved.

A further object is to provide improved means for driving the dropping mechanism, said means being held yieldingly in engagement with the surface of the ground.

Another object is to provide marking means in connection with the machine whereby the rows can be properly laid off.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a plan view of the machine. Fig. 2 is a front elevation thereof, the draft tongue being shown in section and one of the side markers being elevated. Fig. 3 is a perspective view of the rear end portion of the draft tongue and of adjacent parts. Fig. 4 is an enlarged longitudinal section through a portion of the machine, said section being taken on the line A—B Fig. 1. Fig. 5 is a side elevation of one of the seed hoppers and the parts adjacent thereto. Fig. 6 is an enlarged side elevation of the operating wheel of the seed dropping mechanism and of the means for controlling the same. Fig. 7 is a perspective view of a portion of the mechanism provided for transmitting motion to the seed dropping shaft.

Referring to the figures by characters of reference 1 designates an axle carried by supporting wheels 2 and mounted on this axle is a main frame made up of side beams 3 connected, at their rear ends, by an elongated transversely extending beam 4 which extends preferably beyond the wheels 2. At intermediate points the side beams 3 may be connected by cross strips 5 and 6. A shaft 7 extends transversely of and is journaled at its ends within the side strips 3 and fixedly mounted on this shaft is a draft tongue 8 having braces 9 connecting the sides of the tongue to the shaft. Oppositely disposed bowed strips 10 are secured to and extend rearwardly from the sides of the tongue 8 and terminate in rearwardly converging arms 11 to which a link 12 is pivotally attached. This link is connected to the lower end of an adjusting lever 13 fulcrumed on the cross strip 6 and adapted to be locked in any suitable manner. By means of this lever the tongue 8 can be swung about the longitudinal axis of the shaft 7 so as to thus raise or lower the front end of the machine by adjusting the tongue angularly relative to the frame of the machine.

Upstanding from the front end portions of the side beams 3 are guide stems 14 arranged in pairs and on which cross heads 15 are mounted to slide. Springs 16 are interposed between the beams 3 and the cross heads 15 and additional springs 17 are interposed between said cross heads and the upper ends of said stems 14, said upper ends being provided with heads 18 against which the springs 17 abut. Transversely extending strips 19 are extended through slots 20 within the cross heads and are connected at their centers and at their ends by the base portions of seed hoppers 21. Thus it will be seen that the strips 19 and their connections form a supplemental frame which can move relative to the main frame.

A shaft 22 extends between the strips 19 and under the hoppers 21, this shaft being adapted to actuate the seed dropping mechanism, not shown, and which may be of any suitable type. An arm 23 extends upwardly from shaft 22 and is connected, by means of a spring 24, to a rod 25 which is parallel with and supported in front of the strips 19, said rod being connected to the strips by brackets 26 extending forwardly therefrom. A connecting rod 27 extends from the arm 23 rearwardly to one arm of a bell crank lever 28 fulcrumed on an arched rod 29 mounted on the cross strip 5 and fixed relative thereto. The other arm of this bell crank lever projects into the path of a finger 30 which rotates with a shaft 31 journaled in the rear end portions of the side beams 3. Side frames 32 are loosely mounted on the shaft 31 and a shaft 33 is journaled in these side frames and has a marking wheel 34 secured thereto and provided, at regular intervals, with outstanding wings 35 for engaging the soil. A sprocket 36 is secured to and rotates with the shaft 33 and transmits motion through a chain 37 to another sprocket 38 secured to the shaft 31. One of the side frames 32 has an upstanding portion 39 slidably engaged by one end of a rod 40 the other end of which is pivotally connected to an adjusting lever 41 fulcrumed on one of the side beams 3. This lever may be locked against movement in any suitable manner and a collar 42 is arranged on the lever and bears against one end of a spring 43 coiled about the rod. The other end of the spring bears against the extension 39. Thus it will be seen that when lever 41 is swung rearwardly, the rod 40 will slide through the extension 39 while spring 43 will press against the extension and thus swing the frames 32 downwardly so as to press the wheel 34 yieldingly in engagement with the soil. Crossed brace rods 44 are pivotally connected at their rear ends to the cross beam 4 and at their front ends to the rear cross strip 19.

Alining shafts 45 are journaled in the respective side beams 3 and are provided at their inner ends with arms 46 carrying treadles 47. The outer ends of the shafts are formed with crank arms 48 connected, by means of rods 49, to the lower arms of bell crank levers 50 fulcrumed on the side beams 3. The upper arms of these bell crank levers are connected, by means of rods 51, to the rear strip 19. Thus it will be seen that when both of the treadles 47 are pressed downwardly, the bell crank levers 50 will be shifted so as to elevate the supplemental frame made up of the strips 19 and their connections, this elevation resulting in the compression of the springs 17. As soon as the feet are removed from the treadles 47, the springs 17 will return the supplemental frame to its initial position. Obviously by depressing only one of the treadles, only one side portion of the supplemental frame will be elevated. Thus, by manipulating the two treadles, the supplemental frame can be either bodily or only partly raised as desired.

A seed spout 52 extends downwardly from each of the boxes 21 and suspended from the rod 25 in front of each of these spouts is an elongated yoke 53 having a colter disk 54 connected thereto and adapted to open a furrow into which the seeds discharged from the adjacent spout 52 are to be discharged. A covering blade 55 is connected to the yoke and serves to cover the seeds with soil. The yokes 53 are pressed downwardly into engagement with the soil by a spring 56 coiled about a rod 57. This rod is pivotally connected to the yoke 53 and is slidably mounted within one of the cross strips 19. One end of the spring bears against said cross strip while its other end bears against a collar 58 on the rod. Thus it will be seen that the spring exerts a constant pressure upon the collar 58 and the colter disk 54 and the covering blade 55 are thus held yieldingly in engagement with the surface of the soil.

A substantially V-shaped marker 59 is extended from each side of the machine, one arm of the marker being pivotally connected to one end of the cross beam 4, as shown at 60, while the other arm of the marker is pivotally connected to one end of one of the cross strips 19. A lever 61 is fulcrumed upon the cross beam 4 and has a laterally extending arm 62 connected, by means of links 63, to the adjacent arm of the marker 59. A runner 64 is mounted upon the outer end of the marker and is adapted to travel along the surface of the ground while the marker is in use. A gage rod 65 is preferably extended forwardly from the marker 59.

It is to be understood that when the markers 59 are not in use they can be swung upwardly by manipulating the lever 61. One of the markers has been shown thus raised in Figs. 1 and 2.

For the purpose of supporting the draft tongue 8, the central depending yoke 53 is provided with a cross strip 66 on which the tongue may rest when not in use.

It is to be understood of course that the machine herein described is to be used for planting three rows of corn simultaneously. As the machine is drawn forward, the wheel 34 is pressed yieldingly into engagement with the ground so as to cause the wings 35 to cut into the soil and leave marks for the guidance of the operator when planting succeeding rows. As the wheel 34 rotates it will drive the chain 37 so as to cause finger 30 to actuate the bell crank lever 48 and thus cause the dropping mechanism to operate. The length of each marker 59 is about equal to the distance between two rows and in starting at the end of a row, the gage 65 is placed upon one of the marks made along the middle row of the group previously planted. Thus the distance between the rows can be properly gaged as the machine is driven forward. The wheel 34 is preferably started with its wings 35 so located as to mark the newly planted middle row at points alining with the marks in the middle rows of the previously planted series. As the machine moves forward the seed will thus be dropped and covered in the manner hereinbefore described, and, by manipulating the treadles 47 the supplemental frame made up of the strips 19 and their connections can be raised and lowered so as to force the disks to any desired depth in the soil. By pressing downwardly on the treadles 47 the disks can be raised and by pushing forwardly and upwardly on said treadles the disks can be forced down into the soil.

Although the apparatus has been shown and described as designed for planting three rows of corn simultaneously it is to be understood that it can be made in a smaller size for planting but two rows if so desired.

What is claimed is:—

1. A planter including a wheel supported main frame, a spring supported supplemental frame extending transversely thereof, seed boxes carried by the supplemental frame, a furrow opener connected to the supplemental frame and below each seed box, covering devices movable with the furrow opener, means for directing seeds from the boxes and into the furrow, and means under the control of the operator for shifting the supplemental frame downwardly against the supporting spring and relative to the main frame.

2. A planter including a wheel supported main frame, guide stems upstanding therefrom a supplemental frame mounted for vertical adjustment upon the stems, springs upon the stems and above and below the supplemental frame for yieldingly holding said supplemental frame relative to the main frame, seed holding and dropping mechanism carried by the supplemental frame, and separate means under the control of the operator for simultaneously or separately lowering the end portions of the supplemental frame relative to the main frame.

3. A planter including a wheel supported main frame, upstanding guide devices thereon, a supplemental frame mounted for sliding movement on the guide devices, a pivotal connection between said supplemental frame and the main frame, yielding means for supporting the supplemental frame above the main frame, and separate means under the control of the operator for depressing either or both sides of the supplemental frame relative to the main frame.

4. A planter including a wheel supported main frame, upstanding guide devices thereon, a supplemental frame mounted for sliding movement on the guide devices, a pivotal connection between said supplemental frame and the main frame, yielding means for supporting the supplemental frame above the main frame, separate means under the control of the operator for depressing either or both sides of the supplemental frame relative to the main frame, seed boxes mounted on the supplemental frame, and furrow opening means thereunder and carried by said supplemental frame.

5. A planter including a wheel supported main frame, upstanding guides thereon, cross heads slidably mounted on the guides, yielding means for supporting the cross heads above the frame, a supplemental frame slidably mounted within the cross heads and extending transversely of the main frame, seed dropping and covering means carried by the supplemental frame, braces pivotally connected to the main frame and the supplemental frame, and separate means on the main frame and under the control of the operator for depressing either or both of the ends of the supplemental frame relative to the main frame.

6. A planter including a wheel supported main frame, a supplemental frame extending transversely of the front portion of the main frame, means for yieldingly supporting the supplemental frame relative to the main frame, seed dropping and covering mechanism carried by the supplemental frame, separate means under the control of the operator for depressing either or both ends of the supplemental frame relative to the main frame, a side marker pivotally connected to the main and supplemental frames, a gage carried thereby, and means under the control of the operator for raising and lowering the marker relative to the main frame.

7. A planter including a wheel supported main frame, guide stems arranged in pairs and upstanding therefrom, cross heads slidably mounted on the stems, springs upon the stems and above and below the cross heads for controlling the movement of the cross heads, a supplemental frame extending loosely through the cross heads and transversely of the main frame, seed hoppers mounted on the supplemental frame, levers fulcrumed on the main frame, connections between said levers and the supplemental frame, and means for actuating the levers to raise and lower the supplemental frame against the action of the springs and relative to the main frame.

In testimony that I claim the foregoing as my own, I have hereto affixed my signature in the presence of two witnesses.

LARS A. ANFINSON.

Witnesses:
J. A. ERICKSON,
R. P. BERRY.